United States Patent [19]
Karani et al.

[11] Patent Number: 5,410,905
[45] Date of Patent: May 2, 1995

[54] METER FOR COMPARING IMPACT HAMMERS

[76] Inventors: Ron R. Karani, 33799 S. Woodland, Chagrin Falls, Ohio 44022; Daniel E. Tyrrell, 2813 Work Rd., Ravenna, Ohio 44266

[21] Appl. No.: 105,053
[22] Filed: Aug. 12, 1993
[51] Int. Cl.⁶ ............................................. G01L 5/00
[52] U.S. Cl. ................................... 73/11.03; 73/11.01
[58] Field of Search .................. 73/11.01, 11.03, 12.07, 73/49.4; 173/1, 20

[56] References Cited

U.S. PATENT DOCUMENTS

| | | |
|---|---|---|
| 2,224,957 | 6/1938 | Ernst . |
| 2,810,288 | 10/1957 | Herron et al. ............... 73/12.07 |
| 3,187,553 | 11/1961 | Guild et al. . |
| 3,267,677 | 8/1966 | Bollar . |
| 3,535,919 | 10/1970 | Budlong et al. ..................... 73/84 |
| 3,552,184 | 1/1971 | Breese et al. ................. 73/12.07 |
| 3,693,432 | 9/1972 | Stewart et al. ................ 73/12.07 |
| 3,817,091 | 6/1974 | Frederick . |
| 3,931,729 | 1/1976 | Frederick . |
| 4,541,285 | 9/1985 | Häfner . |
| 4,562,722 | 1/1986 | Schuele et al. . |
| 4,586,366 | 5/1986 | Milberger . |
| 4,594,785 | 6/1986 | Carlson . |
| 4,905,502 | 3/1990 | Gram ................................ 73/49.4 |

Primary Examiner—Richard E. Chilcot, Jr.
Assistant Examiner—R. Biegel
Attorney, Agent, or Firm—Vickers, Daniels & Young

[57] ABSTRACT

An apparatus and method of measuring and comparing actual and relative impact forces of an impact machine to determine the operating parameters of the machine wherein the apparatus includes a vessel containing a fluid, a vessel piston which moves into the vessel in a substantially frictionless manner upon impact by the impact machine to create a force on the fluid in the vessel and a measuring system to measure the forces applied to the apparatus.

43 Claims, 1 Drawing Sheet

METER FOR COMPARING IMPACT HAMMERS

BACKGROUND OF THE INVENTION

The invention relates to a method and apparatus for obtaining comparative measurements of forces applied by an impact machine to determine the operating parameters of the tested machine and, more particularly, to an apparatus and method of comparing measured pressures and/or flow rates of a fluid which is acted upon by an impact machine to determine the operating parameters and the desirability of using a particular impact machine for a particular application.

Various types of apparatuses and methods have been used to measure the force of an impact machine with varying success. One type of device is an accelerometer which is used to measure the acceleration of piles being driven into the earth by a pile driving hamer. The velocity of the pile being driven is usually integrated to produce a measurement of pile displacement and its value is combined with the resistance to the force to determine the amount of force being applied to the pile. This type of measurement system is deficient in that the apparatuses typically used to measure the acceleration are not very accurate and the constant resistance applied to the force to the pile is usually not uniform.

As in any impact machine operation, it is important to control the force of the blows applied to a pile or other type of materials so as not to exceed the elastic limit of the material so as to avoid damage to the material. For pile driving techniques, this is commonly known as "overdriving." In an effort to minimize damage, a force distribution device or drive cap can be placed on the pile to uniformly distribute the force being applied. These drive caps are fitted over the head of the pile to transmit the hammer blows evenly to the pile while at the same time maintaining the head of the pile and alignment with the hammer. Although the caps minimize damage to piles, impact devices can still damage the pile if the force applied to the pile is too large for a particular application.

Although it is important to measure the maximum force applied by an impact machine for many applications, it is also important to determine how the impact machine delivers such force. In some applications, a large force over a short duration of time is preferable whereas other applications are better performed by an impact machine that delivers a large force over a longer period of time. Unfortunately, the apparatuses used to measure forces of impact machines only measure the total force applied by the machine, not the type of force applied by the impact machine. Nor can these machines be used to compare one impact machine to another impact machine to determine whether both machines function similarly under similar conditions.

Due to the problems associated with identifying a specific type of impact device to perform a certain force function and the further need to determine whether similar impact machines function the same under similar conditions, there is a substantial need for an apparatus and method which can be used to determine the type of force applied by an impact device and further be used to compare various types of impact devices so as to determine whether these devices function similarly.

SUMMARY OF THE INVENTION

The present invention relates to an apparatus and method for measuring and comparing the impact force of an impact machine.

In accordance with a preferred embodiment of the present invention, there is provided a vessel or container containing a fluid, a vessel piston which moves within the vessel upon impact by an impact machine and a force measuring system which measures force being applied to the fluid in the vessel by the vessel piston. The force measuring system can be any number of different systems such as a pressure gauge, a flow rate meter, a temperature gauge or some other force measuring device which can measure the force or relative force being applied to the fluid within the vessel. The vessel piston is designed to move freely within the vessel in a relatively frictionless manner. The relatively frictionless movement of the piston insures the efficient transfer of force from the impact machine to the fluid within the vessel, while simultaneously minimizing loss of force from friction between the vessel inner wall and the piston. The vessel and the piston are designed out of materials that can withstand large forces, without bending or cracking. Materials such as iron or a metallic alloy may be used for measuring impact devices which generate extremely large forces. The head of the vessel piston may be specially designed in order to withstand large impact forces from an impact machine. A harden vessel piston head which resists cracking is desirable. The piston head may also be shaped to ensure the impact machine strikes the proper point on the piston head to ensure proper and uniform force transference and to minimize damage to the piston and the vessel. The shape of the interior of the vessel and the piston is not limited to any one shape. Geometrical shapes such as cylindrical, cubic, rectangular, etc. may be used. A fluid reservoir is usually attached to the vessel to replenish the fluid within the vessel after the impact machine has been tested. During the testing of the impact machine, some fluid may escape from the vessel and/or some fluid may be removed from the vessel to measure the forces applied by the impact machine. A loss of fluid from the vessel results in the vessel piston not being reset to its test position. A fluid pump may be attached to the fluid reservoir to replenish the fluid in the vessel and to move the vessel piston back to its initial test position. The vessel may contain a piston stopper located at or near the base of the vessel to prevent the piston from contacting the vessel base thereby preventing damage to the piston and/or the vessel and from removing all the fluid from the vessel. The stopper may be made of a material which can sufficiently stop the piston but acts as a slight cushion to prevent damage to the base of the piston.

In accordance with another aspect of the present invention, the vessel and the vessel piston includes a sealing system to prevent the fluid within the vessel from flowing about the piston and out of the vessel. The sealing system may be located on the piston and/or on the interior wall of the vessel. To maximize the seal between the piston and the vessel, especially under high pressure tests, a dual seal arrangement should be used. The dual sealing system insures that the fluid within the vessel does not escape about the vessel piston so as to ensure accurate and repeatable force transference and force measurement by the measuring device. The sealing system is designed so as to provide sufficient fluid sealing without creating substantial friction between the piston and the inner wall of the vessel. The sealing system must provide a tight seal, yet allow the piston to move in a relatively frictionless manner into the vessel so that the applied force from the impact machine is transferred to the fluid in the vessel. The sealing system may include one or more sealing rings located on the piston and/or on the vessel wall interior. When sealing rings are used, the rings are partially imbedded in the piston and/or the vessel wall interior. The seal rings are embedded to secure the rings in position and to control the amount of contact between the piston and the vessel wall to form a proper seal and to allow the piston to move essentially frictionless within the vessel. The sealing ring may be located anywhere on the piston and/or the vessel wall interior. On the piston, the seal rings usually are located near the base of the piston since such a position has been found to maximize the sealing effect of the sealing rings. If sealing rings are positioned on the vessel wall interior, the seal rings are usually located near the top of the vessel.

In accordance with yet another feature of the present invention, the fluid within the vessel is a viscous liquid. The type of fluid within the vessel is important since the affect on the fluid by the impact machine is measured to determine the forces and/or relative force of the impact machine. Fluids such as gasses can be used; however, sealing problems and the compressible nature of gasses make such fluids more difficult to measure. Liquid fluids are easier to seal under high pressure and are significantly less compressible thereby making such fluids more desirable for use in the present invention. Liquid fluids having a high viscosity are the easiest to seal, thus providing a highly desirable fluid for measuring large impact forces. Liquid fluids such as petroleum liquids are a low compressible, viscous fluid which also provides lubrication between the seals and the piston and/or the vessel. The lubricating effect of petroleum liquids further reduces the friction caused by the sealing system to increase the force transference from the impact machine to the fluid. Viscous fluids having a viscosity of at least 60 saybolt universal seconds at 100° F. provides relatively ideal fluids. The viscosity of the fluid should not be too large such that the force applied to the fluid is difficult to measure. Hydraulic oil is one of many liquid fluids that provides complementary sealing and lubrication with the sealing rings and can be easily measured when forces are applied to the fluid.

In accordance of another feature of the present invention, the force measuring device for measuring the force or the relative forces applied to the fluid by an impact device is a pressure measuring system. Once the impact machine strikes the piston, the piston is forced into the vessel containing a fluid. As the piston moves into the vessel, pressure builds up within the vessel. The pressure exerted on the fluid can be measured, correlated and/or compared with other pressure valves to determine the maximum force and/or the relative force imparted by the impact machine. The pressure line connected to the vessel is typically located near the base of the vessel so as to obtain more accurate pressure readings. The pressure measuring system includes a pressure gauge or transducer which is designed to quickly and accurately measure the applied pressure on the fluid. Special types of pressure gauges can be used to accurately measure small or large pressures. If maximum pressure applied by the impact machine is to be recorded, the pressure line includes a check valve to prevent a back flow of fluid from the pressure line back into the vessel when the pressure begins to drop within the vessel. The check valve acts as a gate to only let fluid into the pressure line if the pressure in the vessel is greater than in the pressure line. Other pressure profiles may be measured such as pressure at different time periods, total pressure, rate of pressure increases, etc. If a viscous fluid is used in the vessel, the pressure line may include an accumulator, interposed between the pressure gauge and the vessel, to allow the pressure in the pressure line to reach equilibrium. The pressure profiles formed by the pressure measuring system can be used to determine the type and/or the amount of force applied by the impact machine.

In accordance with another feature of the present invention, the force measuring device includes a restriction and a flow rate measuring system to measure the actual and/or relative energy transferred to the invention by the impact machine per unit of time. When the impact machine strikes the vessel piston thereby forcing the piston into the vessel, a force is applied on the fluid within the vessel. As the force on the fluid increases, the fluid is directed through a fluid flow line. The fluid flow line is typically connected near the base of the vessel to obtain more accurate flow rate readings. The flow rate information is used with information on the restriction to provide information in the energy transfer rate of the impact machine being tested. The flow rate measuring system includes a flow rate measuring device such as an orifice; however, other flow measuring devices such as an ultrasonic flow meter can be used independently or in conjunction with the orifice. The flow measuring device can be designed to measure many different types of flow rate profiles such as maximum flow rates, total flow rate, flow rates at different time periods, maximum increases or decreases in flow rates, etc. These flow rate profiles can then be compared and/or correlated to determine the type and/or the amount of energy/time applied by the impact machine. The fluid flow line may also include a check valve interposed between the vessel and the flow measuring device to prevent the fluid from back flowing into the vessel and causing inaccurate flow rate readings.

In accordance with still yet another feature of the present invention, a fluid purge system is connected to the vessel to remove foreign fluids from the vessel to ensure accurate force measurement readings. The fluid purge system is typically attached to near the base of the vessel. When viscous fluids are used, low viscosity fluids such as air may get trapped at the base of the vessel. Due to the different compressibility factors of a low viscous fluid and a viscous fluid, varying flow rates and pressure readings will be obtained as the amount of trapped low viscous fluid within the vessel increases. By periodically using the purge system to remove foreign fluids from the vessel, accurate and reproducible force reading can be obtained. Reproducible force readings are especially important when the invention is used to compare impact machines with each other.

In accordance with another feature of the present invention, the readings from the force measuring devices are compared to standardized tables or values from other impact machines to determine whether a particular impact machine satisfied a specific job requirement. Although the physical properties measured from the fluid caused by the impact of the impact machine can be used to determine the amount of force applied to the piston head, the measured values obtained can also be used to determine whether or not a particular impact machine will function satisfactorily in a particular working environment. In some working environments, the maximum amount of force or the total amount of force applied by the impact machine is not important, but how the force is applied by the impact machine is of importance. In some operations, a large amount of force applied in a short period of time is desirable, whereas in other applications a large amount of force applied over a longer time period is preferable. By obtaining pressure and/or flow rate profiles from an impact machine, the type of force applied by the impact machine can be analyzed so that it can be determined whether or not the particular impact machine would function properly in a particular working environment. The measurement of pressure is useful for devices that impart a large amount of force in a very short period. Impact machines that deliver such a force generally will not generate high flow rates but usually will generate a large amount of pressure in a short period of time. Upon viewing this data, an operator could determine that such an impact machine does indeed deliver a large force over a short period of time. Impact machines that deliver large amount of force over a larger period of time do not necessarily generate high pressures but usually generate large flow rates. By testing the pressure profile and/or the flow rate profile of an impact machine, the force profile of an impact machine can be identified. Two different force profiles are obtained from measuring both pressure and flow rates. Force profiles which are generated from pressure readings are related to energy imparted by the impact machine per strike or blow by the impact machine. The energy/blow translates into the maximum force/blow the impact machine created when the machine struck the vessel piston. The maximum force/blow readings can be stored and/or recorded as relative readings or can be standardized to reflect the actual maximum force applied by the impact machine. Force profiles generated from flow rate readings correspond to energy per time. The energy/time profile illustrates the amount of energy imparted by the impact machine during the time the impact machine initially strikes the vessel piston to the time the machine ceases in forcing the piston into the vessel. The total energy applied by the impact machine can be calculated by integrating the energy over the total time of the blow. Once these values have been recorded for a particular impact machine, these values can be either correlated to data to determine the amount of force applied by the impact machine and/or compared with other impact machines to be determined whether or not the tested impact machine is properly operating within acceptable operating perimeters and/or would be desirable for a particular operating environment.

The primary object of the present invention is to provide an impact comparator for measuring forces imparted by an impact machine upon the comparator.

Another object of the present invention is to provide a comparator of the foregoing character which includes a vessel containing a fluid and a vessel piston which moves within the vessel upon impact and measures the forces applied to the fluid within the vessel as the piston moves into the vessel.

Yet another object of the present invention is to provide a comparator which contains a sealing system to insure that the fluid within the vessel does not escape about the piston and also provides for a relatively frictionless interface between the piston and the vessel.

Still yet another object of the present invention is to provide a comparator which measures the pressure applied to the fluid by an impact machine.

Another object of the present invention is to provide a comparator which measures the flow rate of a fluid as it exits the vessel as the vessel piston is moved by the impact machine.

Yet still another object of the present invention is to provide a comparator which uses the measured forces which are exerted on the fluid by the impact machine and to compare these forces to other impact machines to determine whether a particular impact machine is properly operating and/or operates within the desired parameters for a specific function.

Still yet another object of the present invention to provide a comparator which uses the measured force values to determine the force applied by the impact machine.

These and other objects and advantages will become apparent to those skilled in the art upon reading the following description taken together with the accompanying drawing.

BRIEF DESCRIPTION OF THE DRAWING

Reference may now be made to the drawing, which illustrates various embodiments that the invention may take in physical form and in certain parts and arrangements of parts wherein.

DETAILED DESCRIPTION OF PREFERRED EMBODIMENTS

Figure 1:
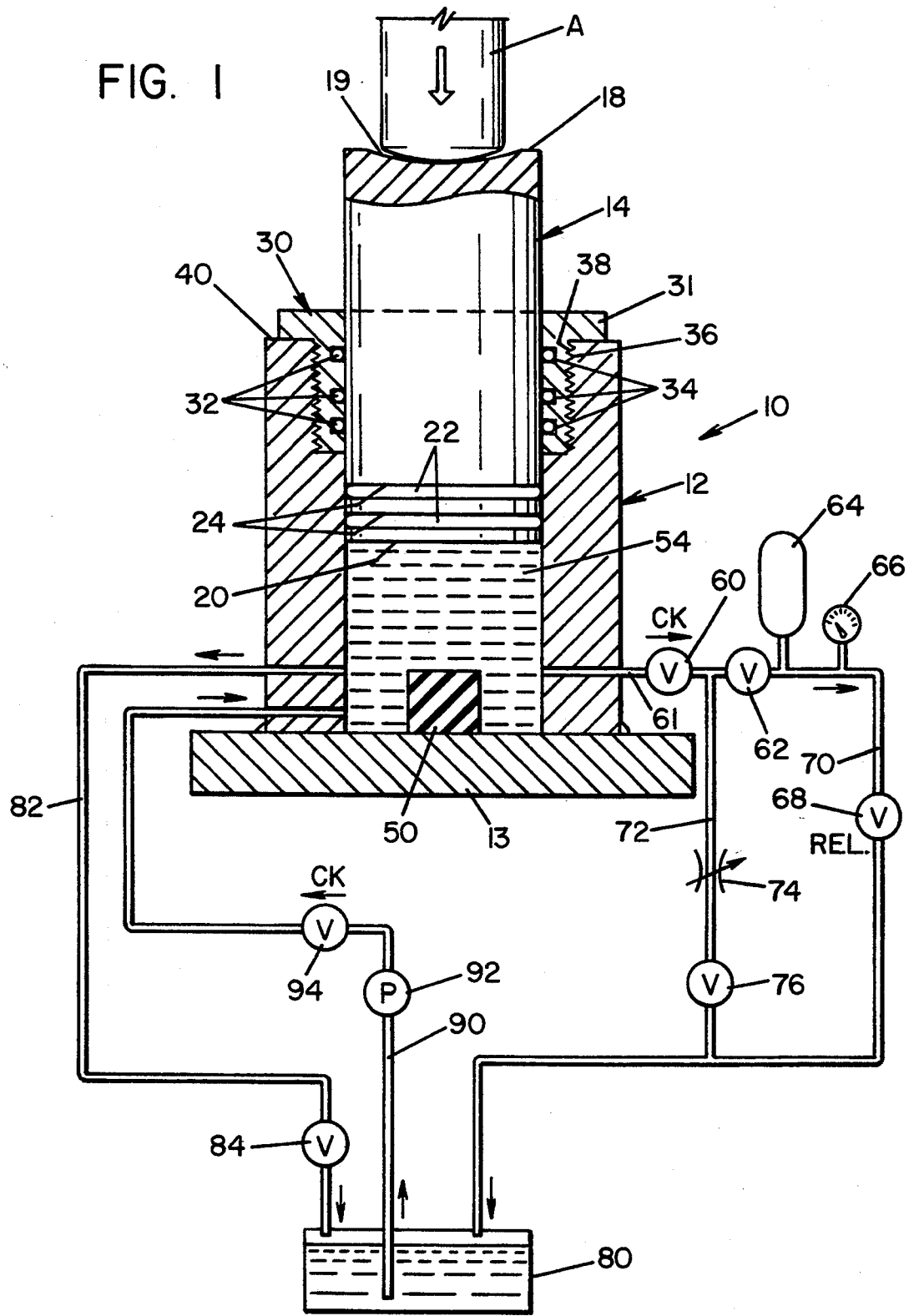
FIG. 1 is a cross-sectional elevation view of the comparative device in accordance with the present invention.

Referring now to the drawing, wherein the showing is for the purpose of illustrating the preferred embodiments of the invention only and not for the purpose of limiting the same, in FIG. 1 there is shown comparator device 10 having a comparator vessel 12 which includes a vessel piston 14 which can move into the interior of vessel 12. The interior of comparator vessel 12 is cylindrical; however, other shapes and configurations may be used. Vessel piston 14 is cylindrically designed to match the interior of vessel 12. Piston 14 has an outer radius which is slightly less than the interior radius of the comparing vessel so as to allow piston 14 to move into the interior of vessel 12. Preferably, comparator vessel 12 is one meter in length. The cylindrical interior chamber of vessel 12 is preferably 975 mm and has a diameter of 360 mm. The thickness of the walls of vessel 12 will vary depending on the type of material vessel 12 is made of. Preferably, vessel 12 is made of a metallic material which can withstand large pressures. Vessel 12 has been described with reference to a comparing device with measures impact machines creating 3000–5000 foot pounds/square foot of force. The dimensions of vessel 12 will be different when test impact machines creating larger or smaller forces. Vessel 12 is connected to vessel base 13 to prevent vessel 12 from moving or falling during testing. Comparator vessel 12 includes at least one stopper 50 located at the interior base of vessel 12. Stopper 50 may be located anywhere about the interior base of vessel 12 and is designed to prevent piston 14 from contacting the interior base of vessel 12 thereby preventing damage to piston 14 and/or to vessel 12. Stopper 50 also prevents the complete discharge of vessel fluid 54 from vessel 12. Stopper 50 is preferably made of a shock absorbing material such as rubber.

Vessel piston 14 includes a piston head 18 composed of a hardened resilient material which can withstand multiple strikes from impact machine A and distribute such force relatively uniformly throughout piston 14. The material is preferably a tempered steel housing which is able to resist multiple large impact forces without damage. Piston head 18 preferably contains piston trough 19 which is a slight depression in the center of piston head 18 which acts as a strike point for impact machine A so that the force can be properly distributed throughout the piston without damaging comparing device 10 and to insure proper measurement of the relative force being applied to the piston.

Comparator device 10 includes a sealing system to prevent vessel fluid 54 from flowing around piston 14 and out of vessel mouth 40 when piston 14 moves into the interior of vessel 12. Preferably, the sealing system is a dual sealing system located on both piston 14 and the interior wall of vessel 12; however, the sealing system may be designed to be located only on the piston or the vessel. It is important to maintain fluid 54 within comparator vessel 12 and direct the fluid through the particular force measurement device so as to insure accurate and reproducible testing results for each impact machine A. Preferably, vessel piston 14 includes two piston seal rings 22 located adjacent to piston base 20. Piston seal ring 22 is positioned onto vessel piston 14 by inserting seal ring 22 into piston seal ridge 24. Piston seal ridge 24 is a grooved, indented surface about the outer circumference of vessel piston 14. Seal ridge 24 insures that seal ring 22 is properly maintained in position on piston 14. The depth of the groove of seal ridge 24 is slightly less than the thickness of the seal ring so that the seal ring slightly protrudes from the outer surface of piston 14 to form a seal region between vessel piston 14 and the interior wall of vessel 12. Seal ring 22 is preferably made up of a silicon or rubber type material which is compressible so as to form a sealable region about the ring; however, other materials which exhibit similar properties may be used. Although seal ring 22 is maintained in a slightly compressed position to insure that a seal is formed between vessel piston 14 and the interior wall of comparator vessel 12, seal ring 22 is not under such a large compression force such that a large amount of friction is exhibited between the seal ring and the interior wall of vessel 12 as vessel piston 14 moves into comparator vessel 12 upon impact by impact machine A. By insuring that the vessel piston moves in a relatively frictionless manner within comparator vessel 12, little measurable force is lost due to friction caused by the seal rings thereby ensuring that essentially all the force applied by impact machine A is applied to fluid 54 within vessel 12.

Comparator vessel 12 also preferably contains a seal system to further insure that fluid 54 will not escape from comparator vessel 12. The sealing system for comparator vessel 12 preferably includes a vessel flange seal 30 which is threaded into the vessel mouth 40 of comparator vessel 12. Vessel flange seal 30 includes flange threading 36 so that the force may be sealably threaded into the vessel threading 38 of comparator vessel 12. Flange 30 may be bolted to vessel mouth 40 to ensure flange 30 remains affixed to vessel 12, especially when large forces are being tested. Vessel flange seal 30 includes a hole along the vertical axis of the seal which has a shape and size exactly the same as the interior of vessel 12. Comparator vessel is slotted so that flange seal 30 can be inserted onto comparator vessel 12 such that the interior surface of flange seal 30 is flush with the interior wall of comparator vessel 12 below flange seal 30 so as to insure that vessel piston 14 properly and uniformly moves through both interior surface of flange seal 30 and the interior surface of comparator vessel 12. Vessel flange seal 30 includes flange head 31 which engages vessel mouth 40 once flange seal 30 is completely threaded into comparator vessel 12. The interior wall of flange seal 30 includes at least one flange seal ring 32 which engages the exterior surface of vessel piston 14. Flange seal rings 32 are positioned in vessel flange seal 30 at flange ridge 34. Each flange ridge 34 is an indented region within flange seal 30 which locks each seal flange seal ring 32 in position with respect to the flange seal and has a depth such that each flange seal ring 32 slightly protrudes beyond the interior surface of vessel flange seal 30 so as to engage the exterior surface of vessel piston 14 to form a sealable surface. Preferably the flange seal rings 32 are made of the same material as piston seal rings 22. The number of flange seal rings on vessel flange seal 30 is preferably three so as to insure proper sealing of the vessel fluid 54 at high pressures. Seal ring which is positioned closest to vessel mouth 40 both inhibits the flow any fluid 54 from vessel 12 and prevents dust, dirt and other foreign materials from entering vessel 12, can interfere with obtaining accurate force readings. The flange seal rings are also designed to allow piston 14 to pass the seal rings in an essentially frictionless manner.

The sealing system of comparator device 10 is enhanced by using a viscous fluid for vessel fluid 54. Various types of fluids act differently under different pressure environments. Gases compress relatively easily and are harder to seal. A liquid having a very large viscosity such as grease, compresses very little under pressure but does not easily flow so that flow rates can not be easily measured. Vessel fluid 54 should have a viscosity of at least 60 saybolt universal seconds at 100° F. Fluids with such a viscosity do not easily compress, can be sealed within vessel 12 effectively with piston and vessel seal rings, and the flow rate and pressure can be easily and accurately measured. Hydraulic oil is preferably used since such a fluid further provides lubrication for the sealing system to further reduce friction between the piston and vessel as the piston moves within the vessel.

The force of impact machine A is measured by a pressure measuring system and a flow measuring system connected to comparator vessel 12. Fluid measurement line 61 is positioned near the base of comparator vessel 12 and is in communication with the interior of comparator vessel 12 to allow vessel fluid 54 to flow through fluid measurement line 61 to the exterior of comparator vessel 12. Fluid measurement line 61 is preferably positioned at the same level or below the top of stopper 50. This position of fluid measurement line 61 insures that when vessel piston 14 contacts stopper 50, the piston base 20 will not seal the entrance to fluid measurement line 61 thereby adversely affecting the accurate measurement of the force applied by impact machine A. Stopper 50 may contain a sensing mechanism to indicate that piston 14 contacted stopper 50.

A check valve 60 can be connected to fluid measurement line 61 so as to prevent the backflow of vessel fluid 54 back into comparator vessel 12 once the pressure in vessel 12 begins to decrease. The check valve is designed only to allow vessel fluid 54 to exit comparator vessel 12 in an easy manner yet prohibit any fluid from re-entering comparator vessel 12 even at high pressures within the fluid measurement line. Check valve 60 is designed to initially resist fluid 54 from entering fluid measurement line 61. When piston 14 is in the initial test position, the piston exerts a force on fluid 54 from the weight of the piston. Furthermore, the weight of the fluid near the mouth of the vessel exerts a force on the fluid near the base of the vessel. These two forces are countered by check valve 60 such that valve 60 will only allow fluid to pass through valve 60 only when an external force is applied to the piston. Check valve 60 must be used when the maximum pressure applied to fluid 54 is to be measured. Once vessel fluid 54 passes through check valve 60, fluid enters pressure line 70. Preferably, pressure gauge 66 is designed to accurately measure pressures up to 5000 PSI; however, different pressure gauge ranges can be used for different types of impact machines to be tested. Pressure gauge 66 is preferably designed to be a glycerin filled pressure gauge since airfilled pressure gauges have a tendency to fail under high pressure rise rates.

When operating comparator device 10 to measure maximum pressure exerted on fluid 54 by impact device A, flow valve 76 and pressure release valve 68 are closed and pressure valve 62 is opened. When impact machine A applies a force to the head of vessel piston 14, vessel piston 14 begins to move into comparator vessel 12 thereby creating a pressure on vessel fluid 54. The increased pressure on fluid 54 forces the fluid to flow through fluid measurement line 61, through check valve 60 through pressure valve 62 and into pressure line 70. As the pressure within pressure line 70 increases, the fluid passing through check valve 60 will decrease until there is an equilibrium of pressure between pressure line 70 and the interior of comparator vessel 12. After this momentary equilibrium, the pressure applied by impact machine A reduces and the pressure within comparator vessel 12 decreases. To prevent a pressure release within pressure line 70, check valve 60 prevents the backflow of the fluid of the vessel fluid 54 within fluid line 61 back into comparator vessel 12 thereby maintaining the pressure within the fluid within pressure line 70. If the pressure increases rapidly in line 70, the pressure within line 70 will take a moment to reach equilibrium. The rapidity for equilibrium of pressure within the pressure line can be increased by attaching an accumulator 64 between pressure valve 62 and pressure gauge 66. Accumulator 64 also facilitates in more accurate and reproducable pressure readings. Once the pressure within pressure line 70 has reached equilibrium, pressure gauge 66 displays the maximum pressure within pressure line 70 and such information may be transmitted to some electronic recording mechanism and/or visually recorded by an operator. Once the pressure in line 70 has been recorded, the pressure within the pressure line is released by opening pressure release valve 68 to allow vessel fluid 54 to flow out of pressure line 70 and into fluid reservoir 80.

In an alternative embodiment, the maximum pressure applied by an impact machine is measured by testing impact machine A at least twice and by not releasing the pressure in pressure line 70 after the first or subsequent tests. When pressure testing by this method, the pressure in pressure line 70 is reset to atmospheric pressure by opening release valve 68 and then closing the valve. After the first test by impact machine A, pressure line 70 is pressurized. Piston 14 is reset and impact machine A again applies a force to piston 14 creating pressure on fluid 54. If the pressure on fluid 54 is greater than the pressure in pressure line 70, fluid will flow into pressure line 70 and increase the pressure within the line. If the pressure applied to fluid 54 is less or equal to the pressure line, check valve 60 will not allow any fluid to flow within the pressure line and will not increase or decrease the pressure reading in line 70. Once the pressure testing is complete and the pressure is recorded, release valve 68 is opened to release the pressure for the testing of another impact machine.

After the pressure tests have been completed, comparator device 10 and impact machine A are reset to as to begin the pressure testing of machine A. During pressure testing, the total and/or maximum flow of fluid 54 from vessel 12 is recorded.

Measurement of maximum flow rate and total flow rate is measured through flow meter 74. Flow meter 74 is preferably an orifice designed to measure both maximum flow rate and/or total flow through fluid line 72 rate. An office and flowmeter can be connected to fluid line 72 to measure both flow rate and pressure drop through line 72.

In operation, the flow of vessel fluid 54 into flow line 72 is measured by closing pressure valve 62 to prevent fluid from flowing into pressure line 70 and opening flow valve 76. Once flow valve 76 is opened, vessel fluid 54 flows through check valve 60 into fluid line 72 through flow meter 74 and into fluid reservoir 80 when a force is applied to piston 14. Once the maximum flow rate, total flow rate and/or pressure drop in fluid line 72 of vessel fluid 54 is measured, these valves may be recorded by an operator and/or electronically stored for further processing.

A purge line 82 is connected to near the base of comparator vessel 12 which communicates with the interior of comparator vessel 12. Purge line 12 is preferably positioned at the same level or slightly higher the top of stopper 50. The purge line is designed so as to remove foreign fluids such as gases trapped in comparator vessel 12. The gases are removed by opening purge valve 84 thereby allowing the foreign fluids trapped in vessel 12 to exit the vessel and into fluid reservoir 80 whereby the foreign fluids may escape into the atmosphere or be disposed. Foreign fluids which are entrapped within vessel 12 can cause inaccurate maximum pressure readings, maximum flow rate and total flow rate readings since the entrapped foreign fluids may have different compression valves than vessel fluid 54. By removing foreign fluids, more uniform and more accurate readings for both pressure and flow will be obtained.

Once impact machine is tested, vessel piston 14 is reset back into the test position. The piston position is reset by replenishing the lost fluid back into comparator vessel 12. The vessel fluid 54 is replenished into vessel 12 by pumping vessel fluid 54 through fluid replenishing line 90 by fluid pump 92. Replenishing line 90 is positioned below the top of stopper 50 so that fluid 54 can be pumped into vessel 12 when vessel piston 14 is resting upon stopper 50. A replenish line check valve 94 is positioned in the fluid replenish line to insure that once the vessel fluid 54 has been pumped into comparator vessel 12, the fluid does not backflow through fluid replenish 90 and into fluid reservoir 80. Preferably, check valve 94 is designed such that it may resist backflow pressures exceeding 6000 PSI. Check valve 94 is also designed to open if pressures exceed a maximum pressure zone which is typically set at about 6000 PSI, so as to release excessive pressures and prevent damages to comparator device 10.

After the measurement of both the pressure and the flow rate values have been obtained, these values may be correlated to obtain the maximum applied force, energy/blow and/or energy/time of impact machine A. These values also may be used as comparable values with other impact machines to determine whether the tested impact machine is properly operating or whether the machine is desirable for a specific operation. In the latter situation, the measurement of maximum force is not necessarily helpful, but the way the force is being applied is useful. Impact devices which exhibit a large amount of force within a small time period will generally produce relatively high maximum pressure readings and maximum flow rate readings but relatively low total flow rate readings. Impact devices which impart large amounts of force over relatively long periods of time will generally exhibit generally lower maximum pressure readings and lower maximum flow rates but will exhibit higher total flow rates. By using these measured values, a force profile of an impact machine can be mapped to determine the type of environment the impact machine can be best used. The force profiles of test machines can also be compared to similarly tested machines to determine whether the tested machine is beginning to malfunction and/or requires adjustment and maintenance.

The invention has been described with reference to a preferred embodiment and alternatives thereof. It is believed that many modifications alterations to the embodiment disclosed will readily suggest themselves to those skilled in the art upon reading and understanding the detailed description of the invention. It is intended to include all such modifications and alterations insofar as they come within the scope of the present invention.

We claim:

1. An apparatus for measuring the impact force caused by an impact machine to determine the operating impact force parameters of the impact machine, said apparatus comprising a vessel containing a fluid, a vessel piston which moves into said vessel in a substantially frictionless manner upon impact by said impact machine to create a pressure on said fluid in said vessel, said vessel piston being in a pressure tight relationship with said vessel, and measuring means for measuring said pressure on said fluid when said impact machine impacts said vessel piston and moves said vessel piston into said vessel, said measuring means include flow rate detection means.

2. An apparatus as in claim 1, wherein said measuring means includes pressure detection means.

3. An apparatus as in claim 2, wherein said pressure detection means includes pressure sensing means for sensing the pressure of said fluid, pressure transmission means for providing communication of said pressure between said vessel and said pressure sensing means, and pressure equalizing means for equalizing said pressure in said pressure transmission means.

4. An apparatus as in claim 1, wherein said flow rate detection means includes flow rate sensing means for determining the flow rate of said fluid and flow rate transmission means for providing communication of said flow rate between said vessel and fluid sensing means.

5. An apparatus as in claim 4, wherein said apparatus includes seal means for preventing said fluid from flowing about said piston as said piston moves into said vessel.

6. An apparatus as claimed in 5, wherein said seal means is located on said vessel and said piston, said seal means includes at least two seal rings.

7. An apparatus as in claim 6, wherein said fluid is a viscous fluid having a viscosity of at least 60 saybolt universal seconds at 100 degrees F.

8. An apparatus as in claim 7, wherein the readings from said measuring means are correlated to determine the impact force applied by said impact machine to said vessel piston.

9. An apparatus as in claim 8, wherein the readings from said measuring means are compared to a predetermined set of parameters to obtain the relative operating parameters of said impact machine.

10. An apparatus as in claim 2, wherein said pressure detection means includes pressure sensing means for sensing the pressure of said fluid, pressure transmission means for providing communication of said pressure between said vessel and said pressure sensing means, and pressure equalizing means for equalizing said pressure in said pressure transmission means.

11. An apparatus as in claim 10, wherein said pressure detection means includes check valve means for preventing a backflow of pressure from said pressure transmission means to said vessel.

12. An apparatus as in claim 1, wherein said flow rate detection means includes flow rate sensing means for determining the flow rate of said fluid and flow rate transmission means for providing communication of said flow rate between said vessel and fluid sensing means.

13. An apparatus as in claim 12, wherein said flow rate detection means includes check valve means for preventing a backflow of fluid from said flow rate transmission means to said vessel.

14. An apparatus as in claim 3, wherein said apparatus includes seal means for preventing said fluid from flowing about said piston as said piston moves into said vessel.

15. An apparatus as in claim 14, wherein said seal means is positioned on said piston.

16. An apparatus as in claim 15, wherein said seal means is located on said vessel.

17. An apparatus as in claim 16, wherein said seal means includes at least one seal ring.

18. An apparatus as in claim 15, wherein said seal means includes at least one seal ring.

19. An apparatus as in claim 14, wherein said seal means is located on said vessel.

20. An apparatus as in claim 19, wherein said seal means includes at least one seal ring.

21. An apparatus as in claim 1, wherein said fluid is a viscous fluid having a viscosity of at least 60 saybolt universal seconds at 100 degrees F.

22. An apparatus as in claim 21, wherein said fluid is hydraulic oil.

23. An apparatus for measuring the impact force caused by an impact machine to determine the operating impact force parameters of the impact machine, said apparatus comprising a vessel containing a fluid, a vessel piston which moves into said vessel in a substantially frictionless manner upon impact by said impact machine to create a pressure on said fluid in said vessel, said vessel piston being in a pressure tight relationship with said vessel, and measuring means for measuring said pressure on said fluid when said impact machine impacts said vessel piston and moves said vessel piston into said vessel, the readings from said measuring means are correlated to determine the impact force applied by said impact machine to said vessel piston.

24. An apparatus for measuring the impact force caused by an impact machine to determine the operating impact force parameters of the impact machine, said apparatus comprising a vessel containing a fluid, a vessel piston which moves into said vessel in a substantially frictionless manner upon impact by said impact machine to create a pressure on said fluid in said vessel, said vessel piston being in a pressure tight relationship with said vessel, and measuring means for measuring said pressure on said fluid when said impact machine impacts said vessel piston and moves said vessel piston into said vessel, the readings from said measuring means are compared to a predetermined set of parameters to obtain the relative operating parameters of said impact machine.

25. A method of analyzing an impact force caused by an impact machine for determining the operating impact force parameters of the impact machine by measuring the impact force applied to a vessel piston which moves into a vessel upon impact by said impact machine, said vessel containing a fluid whereby a pressure is applied to said fluid as said piston moves into said vessel upon impact by said impact machine on said vessel piston, said method includes:
   a) positioning said impact machine in proximity with said vessel piston;
   b) actuating said impact machine to impact said vessel piston and to move said vessel piston into said vessel thereby applying the pressure to said fluid; and
   c) analyzing said pressure applied to said fluid by a flow rate detection means.

26. A method according to claim 25, wherein said pressure is analyzed by a pressure detection means.

27. A method according to claim 26, wherein said flow rate detection means includes flow rate sensing means for determining the flow rate of said fluid and flow rate transmission means for providing communication of said flow rate between said vessel and flow rate sensing means.

28. A method according to claim 27, wherein said vessel piston includes seal means for preventing said fluid from flowing about said piston as said piston moves into said vessel.

29. A method according to claim 28, wherein said vessel includes seal means for preventing said fluid from flowing about said piston as said piston moves into said vessel.

30. A method according to claim 29, wherein said fluid is a viscous fluid having a viscosity of at least 60 saybolt universal seconds at 100 degrees F.

31. A method according to claim 25, wherein said flow rate detection means includes flow rate sensing means for determining the flow rate of said fluid and flow rate transmission means for providing communication of said flow rate between said vessel and flow rate sensing means.

32. A method according to claim 31, wherein said flow rate detection means includes check valve means for preventing a backflow of fluid from said flow rate sensing means to said vessel.

33. A method according to claim 25, wherein said vessel piston includes seal means for preventing said fluid from flowing about said piston as said piston moves into said vessel.

34. A method according to claim 25, wherein said vessel includes seal means for preventing said fluid from flowing about said piston as said piston moves into said vessel.

35. A method according to claim 25, wherein said fluid is a viscous fluid having a viscosity of at least 60 saybolt universal seconds at 100 degrees F.

36. A method of analyzing an impact force caused by an impact machine for determining the operating impact force parameters of the impact machine by measuring the impact force applied to a vessel piston which moves into a vessel upon impact by said impact machine, said vessel containing a fluid whereby a pressure is applied to said fluid as said piston moves into said vessel upon impact by said impact machine on said vessel piston, said method includes:
   a) positioning said impact machine in proximity with said vessel piston;
   b) actuating said impact machine to impact said vessel piston and to move said vessel piston into said vessel thereby applying the pressure to said fluid; and
   c) analyzing said pressure applied to said fluid, said analyzing said pressure includes the measuring the degree of said pressure.

37. A method of analyzing an impact force caused by an impact machine for determining the operating impact force parameters of the impact machine by measuring the impact force applied to a vessel piston which moves into a vessel upon impact by said impact machine, said vessel containing a fluid whereby a pressure is applied to said fluid as said piston moves into said vessel upon impact by said impact machine on said vessel piston, said method includes:
   a) positioning said impact machine in proximity with said vessel piston;
   b) actuating said impact machine to impact said vessel piston and to move said vessel piston into said vessel thereby applying the pressure to said fluid; and
   c) analyzing said pressure applied to said fluid, said analyzing said pressure includes measuring said pressure and comparing said measured pressure to measured pressure of a previously tested impact machine.

38. A method of analyzing an impact force caused by an impact machine for determining the operating impact force parameters of the impact machine by measuring the impact force applied to a vessel piston which moves into a vessel upon impact by said impact machine, said vessel containing a fluid whereby a pressure is applied to said fluid as said piston moves into said vessel upon impact by said impact machine on said vessel piston, said method includes:
   a) positioning said impact machine in proximity with said vessel piston;
   b) actuating said impact machine to impact said vessel piston and to move said vessel piston into said vessel thereby applying the pressure to said fluid;
   c) analyzing said pressure applied to said fluid; and
   d) analyzing said pressure by a pressure detection means, said pressure detection means includes pressure sensing means for sensing the pressure of said fluid, pressure transmission means for providing communication of said pressure between said vessel and said pressure sensing means and pressure equalizing means for equalizing said pressures in said pressures transmission means.

39. A method according to claim 38, wherein said pressure detection means includes check valve means for preventing a backflow of pressure from said pressure transmission means to said vessel.

40. A method of analyzing an impact force caused by a tested impact machine to determine if the tested impact machine operates within a set of parameters, said method includes the steps of:
   a) positioning said impact machine into a test position;
   b) actuating said impact machine to impact a vessel piston thereby creating a pressure on a fluid as the vessel piston moves into a vessel containing the fluid, said piston vessel moving within said vessel in a pressure tight and substantially frictionless manner;
   c) measuring said pressure applied to said fluid by said moving vessel piston;
   d) resetting said impact machine and said vessel piston; and
   e) actuating said impact machine to impact said vessel piston and measuring the pressure applied to said fluid by measuring a flow rate of said fluid out of said vessel.

41. A method according to claim 40, including the step of comparing said measured pressure to similar measurements from previously tested impact machines.

42. A method according to claim 41, including the step of comparing said measured flow rate to similar measurements from previously tested impact machines.

43. A method according to claim 40, including the step of comparing said measured flow rate to similar measurements from previously tested impact machines.

* * * * *